(12) United States Patent
Chen et al.

(10) Patent No.: US 7,254,041 B2
(45) Date of Patent: Aug. 7, 2007

(54) EXPANSION CARD MOUNTING APPARATUS

(75) Inventors: Yun-Lung Chen, Shenzhen (CN); Yu-Ming Xiao, Shenzhen (CN)

(73) Assignees: Hong Fu Jin Precision Industry (ShenZhen) Co., Ltd., Shenzhen, Guangdong (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/306,528

(22) Filed: Dec. 30, 2005

(65) Prior Publication Data

US 2007/0153492 A1    Jul. 5, 2007

(51) Int. Cl.
*H05K 7/12* (2006.01)

(52) U.S. Cl. .................. 361/801; 301/726; 301/732; 301/759; 301/747

(58) Field of Classification Search .............. 361/732, 361/740, 747, 759, 801, 726; 211/41.17; 312/223.2, 223.3
See application file for complete search history.

(56) References Cited

U.S. PATENT DOCUMENTS

| | | | |
|---|---|---|---|
| 5,640,309 A | | 6/1997 | Carney et al. |
| 5,694,291 A | * | 12/1997 | Feightner .................. 361/683 |
| 5,757,618 A | * | 5/1998 | Lee ............................ 361/686 |
| 6,231,139 B1 | * | 5/2001 | Chen ........................ 312/223.2 |
| 6,320,752 B1 | * | 11/2001 | Jang ........................... 361/740 |
| 6,320,760 B1 | * | 11/2001 | Flamm et al. .............. 361/801 |
| 6,442,038 B1 | * | 8/2002 | Erickson et al. ........... 361/759 |
| 6,480,392 B1 | * | 11/2002 | Jiang ........................... 361/755 |
| 6,515,867 B2 | * | 2/2003 | Sheng-Hsiung et al. .... 361/759 |
| 6,549,398 B2 | * | 4/2003 | Chen ........................... 361/683 |
| 6,552,913 B2 | * | 4/2003 | Tournadre ................... 361/759 |
| 6,608,765 B2 | * | 8/2003 | Vier et al. ................... 361/801 |
| 6,639,151 B1 | * | 10/2003 | Chen et al. ................. 174/666 |
| 6,693,802 B2 | * | 2/2004 | Vier et al. ................... 361/801 |
| 6,700,791 B1 | * | 3/2004 | Zappacosta ................. 361/759 |
| 6,704,205 B1 | * | 3/2004 | Chen ........................... 361/740 |
| 6,937,467 B2 | * | 8/2005 | Hsu ............................. 361/686 |
| 6,960,720 B2 | * | 11/2005 | Wen-Lung ................... 174/50 |

* cited by examiner

*Primary Examiner*—Dean A. Reichard
*Assistant Examiner*—Dameon E. Levi
(74) *Attorney, Agent, or Firm*—Wei Te Chung

(57) ABSTRACT

A mounting apparatus for expansion cards, each of the expansion cards includes a slot cover. The mounting apparatus includes a chassis having a rear panel, a retaining bracket, and a top cover mounted on the chassis. The rear panel defines a plurality of slots for receiving the slot covers, and forms a support plate. A pair of securing slots is defined on the rear panel. The retaining bracket is detachably seated on the support plate. The retaining bracket includes a pressing plate and a main body perpendicular to the pressing plate. A pair of securing members extends outward from the main body, for engaging in the securing slots. The top cover has a flange extending down, and the main body of the retaining bracket is sandwiched between the flange of the top cover and the rear panel of the chassis.

19 Claims, 4 Drawing Sheets

EXPANSION CARD MOUNTING APPARATUS

FIELD OF THE INVENTION

The present invention relates to mounting apparatuses, and more particularly to a mounting apparatus for readily and securely mounting expansion cards in a computer enclosure.

DESCRIPTION OF RELATED ART

Many computer systems include not only a motherboard, but also one or more expansion cards that provide specialized functions. Such expansion cards conventionally have been sold with a vertical slot cover along one edge having an outward extending tab. When an expansion card is plugged into pin connectors inside a computer enclosure, the extending tab of the slot cover abuts a support plate formed at a rear panel of the enclosure. A cutout defined in the tab of the slot cover coincides with a hole defined in the support plate. A screw or a bolt is extended through the cutout and engaged in the hole. The slot cover is thus secured to the support plate.

When installing or removing several expansion cards, using fasteners such as screws or bolts is laborious and time-consuming. In addition, a tool such as a screwdriver or a wrench is usually required.

What is needed, therefore, is an expansion card mounting apparatus for easy and quick installation and removal of expansion cards to and from equipment such as a computer enclosure.

SUMMARY OF INVENTION

A mounting apparatus for expansion cards, each of the expansion cards includes a slot cover. The mounting apparatus includes a chassis having a rear panel, a retaining bracket, and a top cover mounted on the chassis. The rear panel defines a plurality of slots for receiving the slot covers, and forms a support plate. A pair of securing slots is defined on the rear panel. The retaining bracket is detachably seated on the support plate. The retaining bracket includes a pressing plate and a main body perpendicular to the pressing plate. A pair of securing members extends outward from the main body, for engaging in the securing slots. The top cover has a flange extending down, and the main body of the retaining bracket is sandwiched between the flange of the top cover and the rear panel of the chassis.

Other advantages and novel features of the present invention will be drawn from the following detailed description of preferred embodiments of the present invention with the attached drawings, in which:

DETAILED DESCRIPTION

Figure 1:
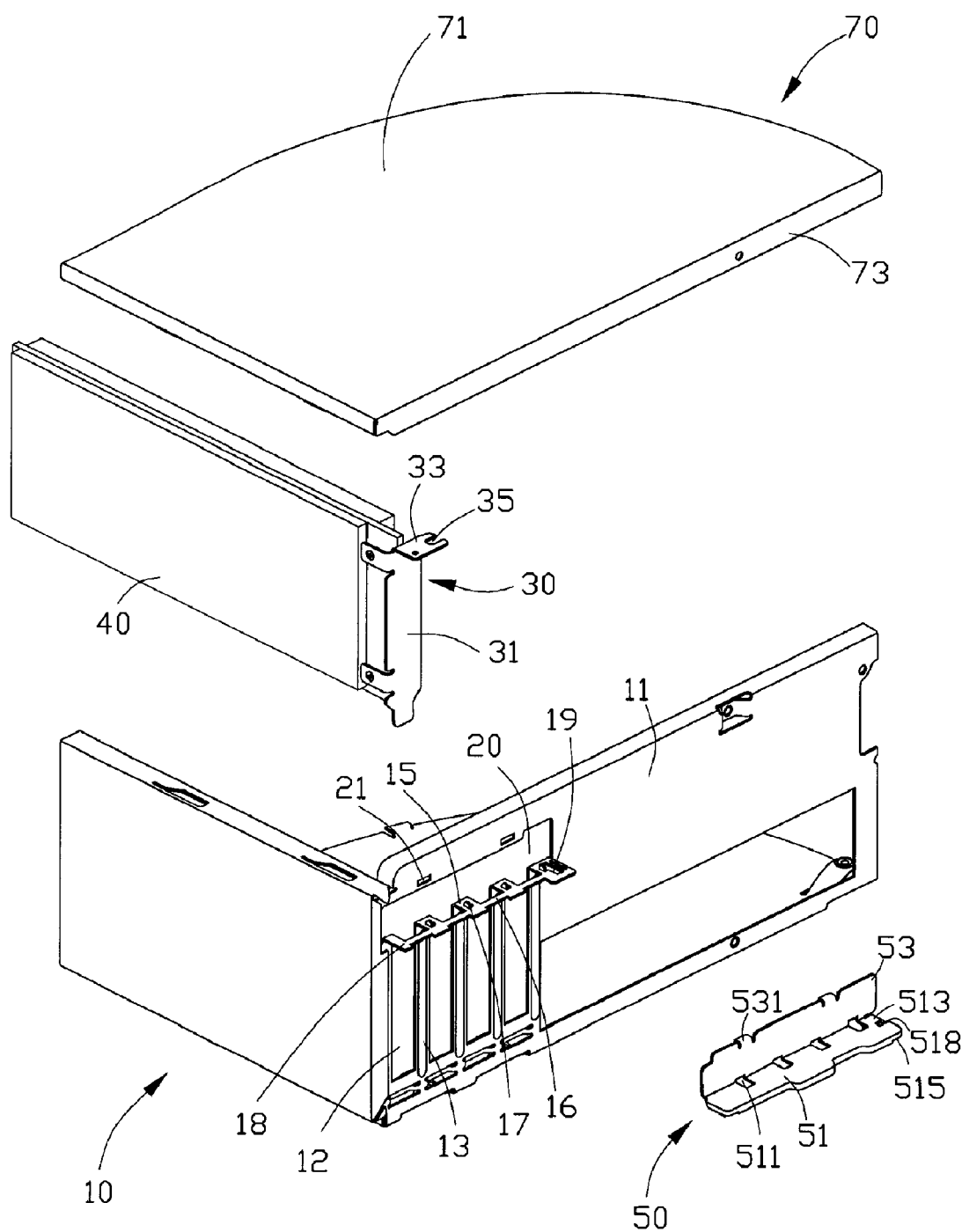
FIG. 1 is an exploded, isometric view of an expansion card mounting apparatus in accordance with a preferred embodiment of the present invention, together with a slot cover connected to an expansion card, the expansion card mounting apparatus including a chassis, a retaining bracket, and part of a top cover.

Referring to FIG. 1, it illustrates an expansion card mounting apparatus in accordance with a preferred embodiment of the present invention, for retaining one or more expansion cards 40 each having a slot cover 30. In FIG. 1, only one expansion card 40 is shown. The expansion card mounting apparatus includes a chassis 10 having a rear panel 11, a retaining bracket 50 pivotally attached to the rear panel 11, and a top cover 70 mounted on the chassis 10.

The rear panel 11 defines a rectangular opening 20 in a side portion thereof. A plurality of vertical slots 12 evenly spaced by a plurality of bars 13, are defined in the rear panel 11 under the opening 20, for receiving the slot covers 30. A supporting tab 15 having a protrusion 17 formed thereon, extends outward from each top edge of the bars 13. A beam 16 connects to the supporting tabs 15, and forms a support plate 18 together with the supporting tabs 15. One end portion of the support plate 18 defines a pivot slot 19. A pair of securing slots 21 is also defined in the rear panel 111 above the opening 20.

The slot cover 30 includes a base portion 31 for covering the slot 12 of the rear panel 11, and a tab 33 extending outward from the top end of the base portion 31. A gap 35 defined in the tab 33 coincides with the protrusion 17 formed on the supporting tab 15.

Figure 2:
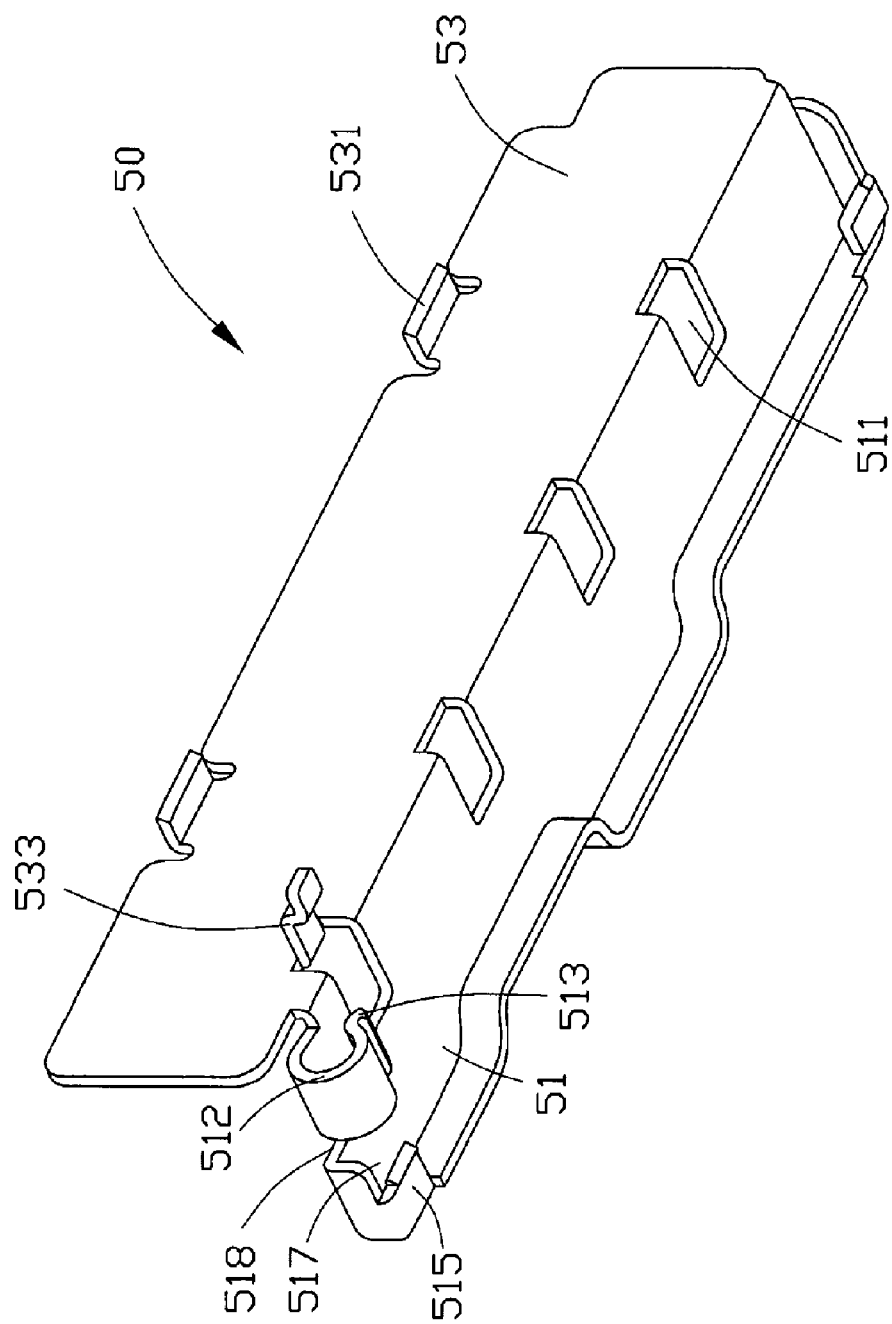
FIG. 2 is an enlarged view of the retaining bracket of FIG. 1.

Referring also to FIG. 2, the retaining bracket 50 includes a horizontal pressing plate 51 with a plurality of spaced cutouts 511 defined therein, and a main body 53 perpendicularly bent from one longitudinal edge of the pressing plate 51. A pivot portion 512 is formed at one end portion along the longitudinal edge. In the present embodiment, the pivot portion 512 is an open cylinder-shaped member. A distal edge of the pivot portion 512 is turned up forming a guiding part 513, for guiding the pivot portion 512 to slide into the pivot slot 19 of the support plate 18. The clearance of the open end of the pivot portion 512 is less than the predetermined thickness of the support plate 18. The dimensions of the pivot portion 512 are less than that of the pivot slot 19; so, the pivot portion 512 can freely slide in the pivot slot 19. A pair of tabs 515 extends downward and then backward from the two opposite ends of the pressing plate 51. The tabs 515 and the pressing plate 51 cooperate to form a sliding slot 517, for the support plate 18 to slide in along a direction perpendicular to the rear panel 11. A gap 518 is defined between the tab 515 adjacent the pivot portion 512 and the pivot portion 512, to provide space for the movement of the retaining bracket 50 when it is rotated. The retaining bracket 50 is held within the rear panel 11 by means of a pair of securing members 531 extending outward from the upper flange of the main body 53, into a pair of corresponding securing slots 21. A blocking tab 533 extends backward from the main body 53 at an extremity of the cutout 511, for preventing the retaining bracket 50 from over-rotating.

The top cover 70 includes a panel 71 and a flange 73 extending down from an edge of the panel 71.

Figure 3:
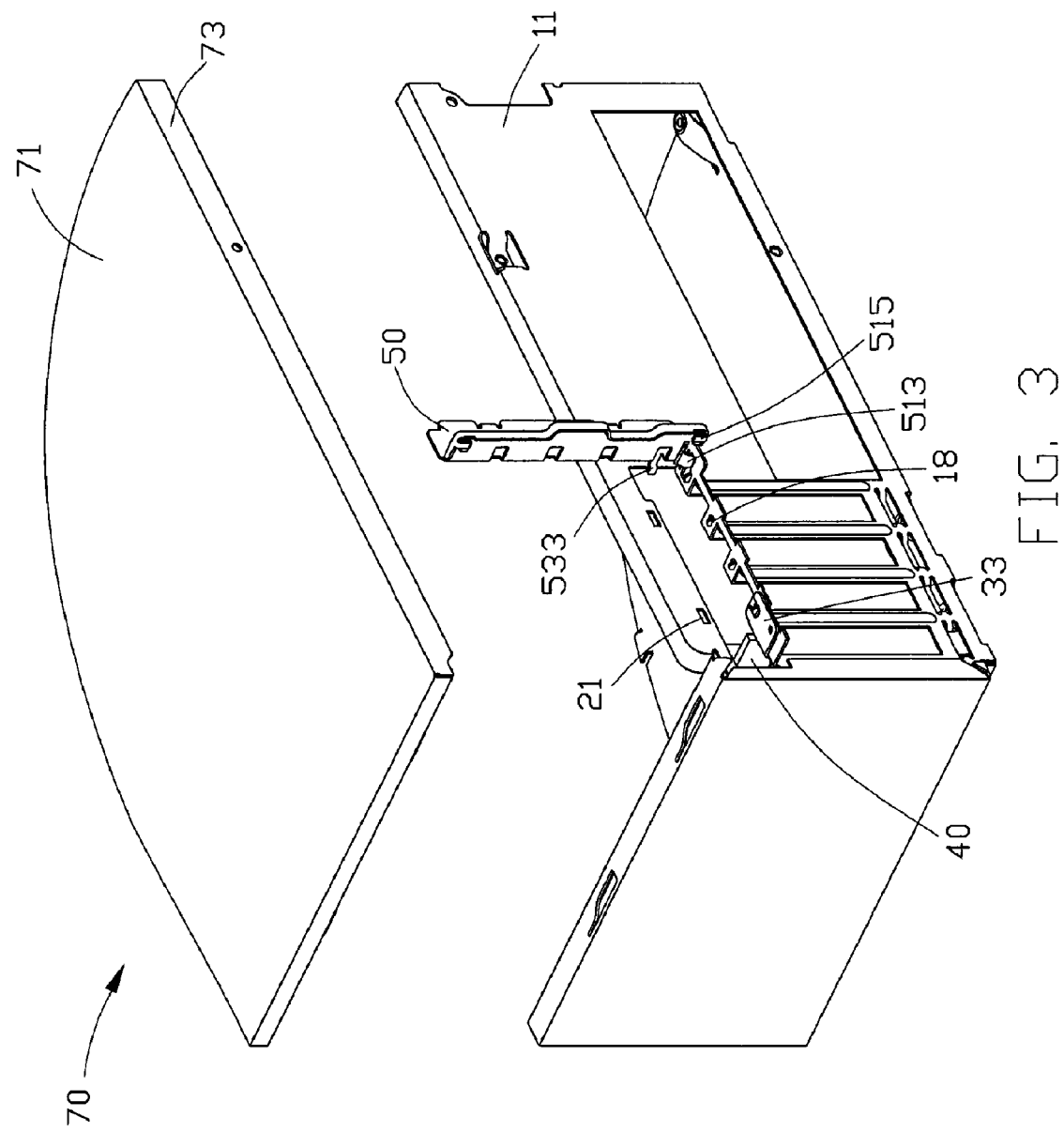
FIG. 3 is an assembled view of FIG. 1 when the retaining bracket is rotated to a vertical position.
Figure 4:
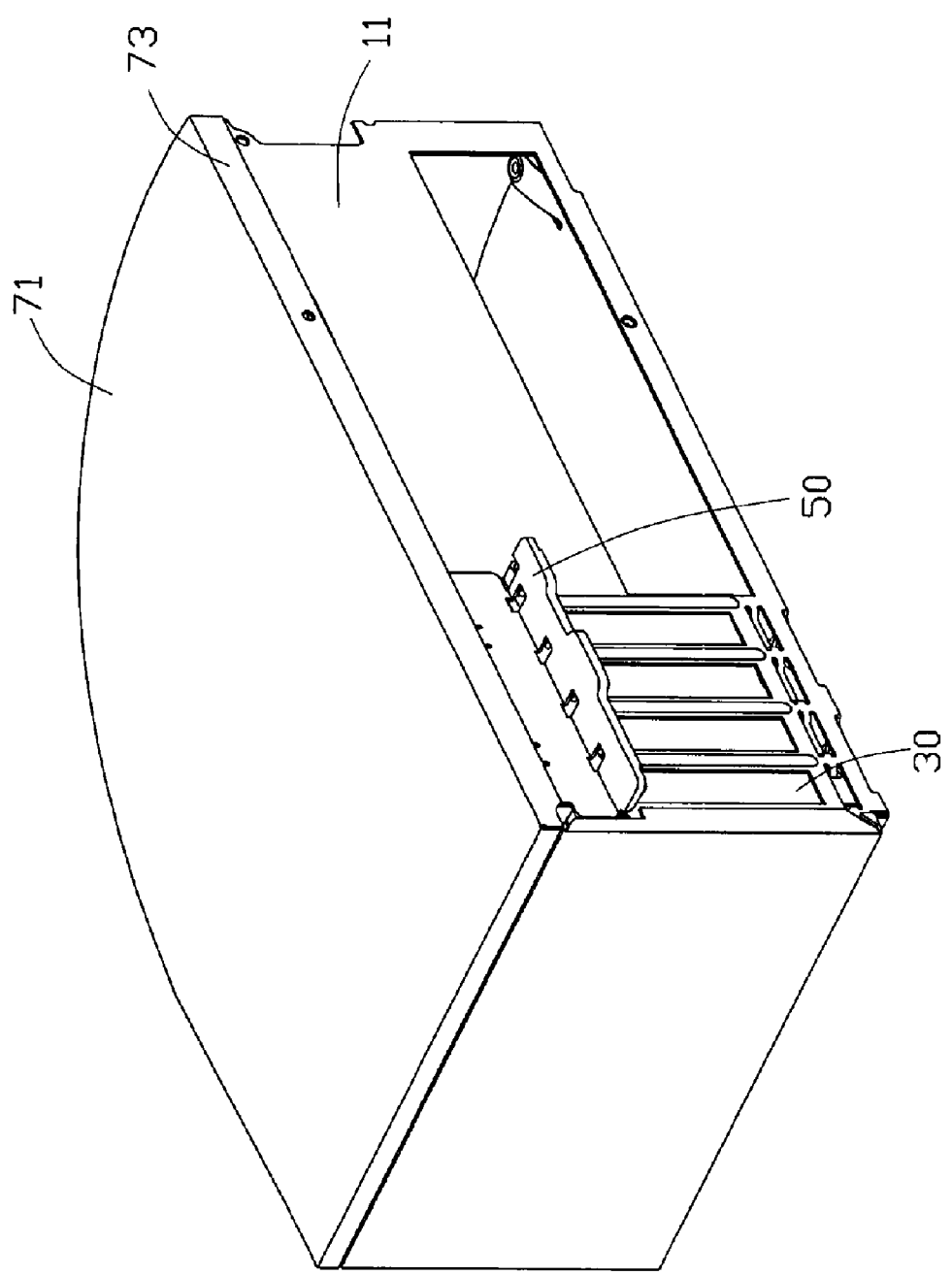
FIG. 4 is an assembled view of FIG. 1.

Referring also to FIGS. 3 and 4, in assembly, the retaining bracket 50 is pivotally mounted on the rear panel 111 of the chassis 10 with the pivot portion 512 slidingly inserted into the pivot slot 19. The guiding part 513 is elastically deformed when the support plate 18 enters the pivotal portion 512, and rebounds to an initial state after the retaining bracket 50 is attached to the rear panel 111 of the chassis 10. Because the clearance of the open end of the pivot portion 512 is less than the predetermined thickness of the support plate 18, the retaining bracket 50 can be pivotally attached to the rear panel 11 without disengaging from the pivot slot 19.

The slot cover 30 with the expansion card 40 is placed over the vertical slot 12. The extending tab 33 of the slot cover 30 abuts the support plate 18 of the rear panel 11. The protrusion 17 of the supporting tab 15 is received by the gap 35 of the slot cover 31. The pressing plate 51 is rotated to a horizontal position to press against the tab 33 on the support plate 18. The support plate 18 is received by the sliding slot 517. Then, the retaining bracket 50 is pushed to slide on the support plate 18 toward the rear panel 11, and cover the opening 20 of the rear panel 11. The securing members 531 engage in the corresponding securing slots 21. Then, the top cover 70 is mounted on the chassis 10. The main body 53 of the retaining bracket 50 is sandwiched between the flange 73 of the top cover 70 and the rear panel 11, for preventing the retaining bracket 50 from moving outward. Thus, the tab 35 of the slot cover 30 is securely sandwiched between the pressing plate 51 of the retaining bracket 50 and the support plate 18 of the rear panel 11. Accordingly, the expansion card 40 is mounted to the rear panel 11.

In disassembly, the top cover 70 is removed from the chassis 10. The retaining bracket 50 is pulled rearward and slid away from the rear panel 11 so that the securing members 531 disengage from the securing slots 21. Then, the retaining bracket 50 is rotated to a vertical position so that the slot cover 31 is released from the support plate 18. The blocking tab 533 of the retaining bracket 50 is stopped by a side edge of the opening 20, for preventing the retaining bracket 50 from over-rotating. Accordingly, the expansion card 40 is removed from the chassis 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for one or more expansion cards, each of the expansion cards comprising a slot cover, the mounting apparatus comprising:
   a chassis having a rear panel, the rear panel defining a plurality of slots for receiving the slot covers, and forming a support plate, a securing slot defined in the rear panel;
   a retaining bracket detachably seated on the support plate, the retaining bracket comprising a pressing plate and a main body perpendicular to the pressing plate, a securing member extending outward from the main body, for engaging in the securing slot, a pair of tabs respectively extending downward and then backward from two opposite ends of the pressing plate, and each of the tabs and the pressing plate together defining therebetween a sliding slot configured for the support plate sliding therein when the retaining bracket is attached to the support plate whereby the pressing plate secures the slot cover on the support plate; and
   a top cover mounted on the chassis, the top cover having a downward extending flange configured for cooperating with the real panel for sandwiching the main body of the retaining bracket therebetween.

2. The mounting apparatus for expansion cards as claimed in claim 1, wherein the retaining bracket is pivotally attached to the support plate of the rear panel before the support plate slides in the sliding slots.

3. The mounting apparatus for expansion cards as claimed in claim 2, wherein the support plate defines a pivot slot at an end portion thereof and the retaining bracket forms a pivot portion engaging in the pivot slot.

4. The mounting apparatus for expansion cards as claimed in claim 3, wherein the pivot portion is formed as an open cylinder-shaped member.

5. The mounting apparatus for expansion cards as claimed in claim 4, wherein a distal edge of the pivot portion is turned up forming a guiding part, for guiding the pivot portion to engage in the pivot slot.

6. The mounting apparatus for expansion cards as claimed in claim 3, wherein one of the tabs is adjacent the pivot portion of the retaining bracket, and a gap is defined between the one of the tabs and the pivot portion, for providing a space for the movement of the retaining bracket when it is rotated.

7. The mounting apparatus for expansion cards as claimed in claim 1, wherein an opening is defined under the securing slots of the rear panel, and the main body of the retaining bracket is placed to cover the opening.

8. The mounting apparatus for expansion cards as claimed in claim 7, wherein the retaining bracket further comprises a blocking tab extending outward from the main body of the retaining bracket, the blocking tab is blocked by an edge of the opening, for preventing the retaining bracket from over-rotating.

9. A mounting apparatus for one or more expansion cards, each of the expansion cards comprising a slot cover having a tab, the mounting apparatus comprising:
   a chassis having a rear panel, the rear panel defining a plurality of slots for receiving the slot covers, and forming an outward extending support plate for placement of the tab of the slot cover thereon, the support plate defining a pivot slot; and
   a retaining bracket seated on the support plate, the retaining bracket forming a pivot portion at an end portion thereof for pivotally engaging into the pivot slot, a tab bent down from the retaining bracket to define a holding space therebetween, wherein when the retaining bracket is pivoted down along the rear panel toward the support plate to a horizontal position and then slides along a direction perpendicular to the rear panel, the tab holds the support plate in the holding space.

10. The mounting apparatus for expansion cards as claimed in claim 9, wherein the retaining bracket comprises a main body and a pressing plate perpendicular to the main body, and the pressing plate is placed on the support plate of the rear panel for sandwiching the tab of the slot cover therebetween.

11. The mounting apparatus for expansion cards as claimed in claim 10, wherein a pair of securing slots is defined in the rear panel, and a pair of securing members extends outward from the main body of the retaining bracket, for engaging in the securing slots respectively.

12. The mounting apparatus for expansion cards as claimed in claim 9, wherein the pivot portion is formed as an open cylinder-shaped member.

13. The mounting apparatus for expansion cards as claimed in claim 12, wherein a distal edge of the pivot portion is turned up forming a guiding part, for guiding the pivot portion to engage in the pivot slot.

14. The mounting apparatus for expansion cards as claimed in claim 10, wherein an opening is defined above the slots of the rear panel and covered by the main body, and the retaining bracket further comprises a blocking tab extending from the retaining bracket, the blocking tab blocked by an edge of the opening, for preventing the retaining bracket from over-rotating.

15. The mounting apparatus for expansion cards as claimed in claim 9, further comprising a top cover mounted on the chassis, the top cover having a flange extending theredown, and the retaining bracket sandwiched between the flange of the top cover and the rear panel of the chassis.

16. The mounting apparatus for expansion cards as claimed in claim 9, wherein the support plate comprises a free edge, the tab is bent down and then backward from the retaining bracket to form a sliding slot for the free edge of the support plate sliding therein.

17. A mounting apparatus for an expansion card, comprising:
 a panel defining an opening with a support plate located at one edge of the opening, a first securing portion formed adjacent an opposite edge of the opening; and
 a retaining bracket attached to one end portion of the support plate, the retaining bracket being pivotable about an axis perpendicular to the panel and slidable along a direction perpendicular to the panel, the retaining bracket comprising a pressing plate corresponding to the support plate, and a main body corresponding to the opening and forming a second securing portion corresponding to the first securing portion, wherein when the retaining bracket is pivoted about the axis toward the support plate and then slid along the direction toward the panel, the first securing portion engages with the second securing portion for securing the retaining member in a lock position where the pressing plate and the support plate cooperatively defines a space for engagingly sandwiching a slot cover of the expansion card therebetween.

18. The mounting apparatus of claim 17, wherein the first securing portion is a securing slot, and the second securing portion is a securing tab bent from the main body, the securing tab being inserted into the securing slot in the direction perpendicular to the panel when the retaining bracket slides along the direction toward the panel.

19. The mounting apparatus of claim 18, further comprising another panel attached to the panel configured for sandwiching the main body of the retaining bracket therebetween thereby preventing the second securing portion from disengaging from the first securing portion.

* * * * *